(12) United States Patent
Strong et al.

(10) Patent No.: US 10,596,943 B2
(45) Date of Patent: Mar. 24, 2020

(54) STANCHION PADDING

(71) Applicants: AMATRIMARA INC., Oakville (CA); BENTECH INC., Philadelphia, PA (US)

(72) Inventors: Scott Strong, Oakville (CA); Michael Klinck, Oakville (CA)

(73) Assignees: AMATRIMARA INC., Oakville (CA); BENTECH INC., Philadelphia, PA (US)

(*) Notice: Subject to any disclaimer, the term of this patent is extended or adjusted under 35 U.S.C. 154(b) by 74 days.

(21) Appl. No.: 15/666,010

(22) Filed: Aug. 1, 2017

(65) Prior Publication Data

US 2018/0057074 A1 Mar. 1, 2018

Related U.S. Application Data

(60) Provisional application No. 62/378,771, filed on Aug. 24, 2016.

(51) Int. Cl.
*B60N 3/02* (2006.01)
*F16L 59/075* (2006.01)
(Continued)

(52) U.S. Cl.
CPC ............ *B60N 3/02* (2013.01); *B32B 1/08* (2013.01); *B32B 3/08* (2013.01); *B32B 3/20* (2013.01);
(Continued)

(58) Field of Classification Search
CPC . B60N 3/02; B60N 3/026; F16L 57/00; F16L 59/021; F16L 59/06; F16L 59/075; Y10T 16/466; Y10T 16/48; Y10T 16/498; Y10T 16/478; Y10T 16/495; E01F 15/141; E04F 11/1808; E04F 11/1814; E04F 2011/1897; G09F 3/0295
(Continued)

(56) References Cited

U.S. PATENT DOCUMENTS 1,010,133 A * 11/1911 Fleming ............... B60N 3/02
                                                    105/354
2,140,157 A * 12/1938 Huffman ............. D06F 75/34
                                                    38/90
(Continued)

FOREIGN PATENT DOCUMENTS

GB           1411733 A  * 10/1975  ............ F16L 59/021

*Primary Examiner* — Mary E McManmon
*Assistant Examiner* — Richard K. Durden
(74) *Attorney, Agent, or Firm* — Im IP Law; Chai Im; C. Andrew Im

(57) ABSTRACT

The present invention relates to stanchion padding and more specifically to stanchion padding for use in transit vehicles. The stanchion padding of the present invention comprises a tube having a hollow centre running through it from a first end to a second end and the tube also comprising an exterior wall and an interior wall joined by at least two channel walls forming at least two hollow channels. These hollow channels may be adapted to receive end caps and at least one end cap may be installed onto either the first end or the second end of the tube. The interior wall may additionally have small inner channels running the length of the tube. The tube may be made by thermoplastic extrusion and at least one end cap may be made by thermoplastic injection molding.

8 Claims, 4 Drawing Sheets

(51) Int. Cl.

| | | |
|---|---|---|
| *F16L 57/00* | (2006.01) | |
| *B32B 3/20* | (2006.01) | |
| *B32B 1/08* | (2006.01) | |
| *B32B 15/08* | (2006.01) | |
| *B32B 7/12* | (2006.01) | |
| *B32B 3/08* | (2006.01) | |
| *B32B 27/08* | (2006.01) | |
| *B32B 15/18* | (2006.01) | |
| *E04F 11/18* | (2006.01) | |
| *E01F 15/14* | (2006.01) | |
| *B60N 2/24* | (2006.01) | |

(52) U.S. Cl.
CPC ............... *B32B 7/12* (2013.01); *B32B 15/08* (2013.01); *B32B 27/08* (2013.01); *B60N 3/026* (2013.01); *F16L 57/00* (2013.01); *F16L 59/075* (2013.01); *B32B 15/18* (2013.01); *B32B 2250/03* (2013.01); *B32B 2597/00* (2013.01); *B32B 2605/00* (2013.01); *B60N 2002/247* (2013.01); *E01F 15/141* (2013.01); *E04F 11/1808* (2013.01); *E04F 2011/1897* (2013.01)

(58) Field of Classification Search
USPC ...... 105/354; 52/834, 835, 717.05; 267/139, 267/140; 74/551.9, 558.5; 248/345.1, 248/636; 403/268
See application file for complete search history.

(56) References Cited

U.S. PATENT DOCUMENTS

| | | | | |
|---|---|---|---|---|
| 2,593,714 A * | 4/1952 | Robinson | ............... | B29C 49/44 144/348 |
| 2,672,103 A * | 3/1954 | Hohmes | ............... | B60N 3/02 105/354 |
| 3,379,221 A * | 4/1968 | Harry | ............... | F16L 9/127 138/148 |
| 3,464,450 A * | 9/1969 | Steffenini | ............... | B29C 47/0028 138/113 |
| 3,581,776 A * | 6/1971 | Sheahan | ............... | F16L 59/021 138/108 |
| 3,777,502 A * | 12/1973 | Michie, III | ............... | F16L 9/18 137/340 |
| 3,873,076 A * | 3/1975 | Evans | ............... | B63B 59/02 267/140 |
| 3,941,157 A * | 3/1976 | Barnett | ............... | B29C 47/0028 138/115 |
| 4,077,664 A * | 3/1978 | Harder, Jr. | ............... | B29C 44/1271 16/431 |
| 4,157,194 A * | 6/1979 | Takahashi | ............... | F16L 9/127 285/3 |
| 4,280,534 A * | 7/1981 | van Dongeren | ............... | B29C 53/14 138/109 |
| 4,305,899 A * | 12/1981 | van Dongeren | ............... | B29C 47/0028 264/405 |
| 4,440,195 A * | 4/1984 | van Dongeren | ............... | B29C 47/0028 138/115 |
| 4,877,673 A * | 10/1989 | Eckel | ............... | B65D 81/054 428/172 |
| 5,193,246 A * | 3/1993 | Huang | ............... | A63B 49/08 16/421 |
| 5,323,583 A * | 6/1994 | Venegas, Jr. | ............... | E01F 15/003 256/1 |
| 5,355,552 A * | 10/1994 | Huang | ............... | A63B 49/08 16/421 |
| 5,471,809 A * | 12/1995 | Frankel | ............... | E04C 3/29 138/114 |
| 5,819,594 A * | 10/1998 | Sjovall | ............... | B62K 21/26 74/551.9 |
| 6,098,704 A * | 8/2000 | Tsuchiya | ............... | B21C 23/10 165/154 |
| 6,154,928 A * | 12/2000 | Thom | ............... | E05B 1/0053 16/413 |
| 6,467,756 B1 * | 10/2002 | Elsasser | ............... | E04H 12/2215 248/156 |
| 6,564,831 B1 * | 5/2003 | Sanoner | ............... | B29C 47/0028 138/115 |
| 6,643,982 B1 * | 11/2003 | Lapp, Jr. | ............... | E04C 3/36 52/127.2 |
| 8,556,115 B2 * | 10/2013 | Bellerose | ............... | B65D 25/2841 206/368 |
| 10,072,425 B1 * | 9/2018 | Madden | ............... | F16B 7/0413 |
| 2002/0056251 A1 * | 5/2002 | Venegas, Jr. | ............... | E01F 15/003 52/834 |
| 2004/0126562 A1 * | 7/2004 | Manzo | ............... | F16L 59/021 428/313.5 |
| 2007/0256276 A1 * | 11/2007 | Holland-Letz | ............... | B25G 1/01 16/111.1 |
| 2008/0029676 A1 * | 2/2008 | Huxtable | ............... | A47B 95/043 248/345.1 |

* cited by examiner

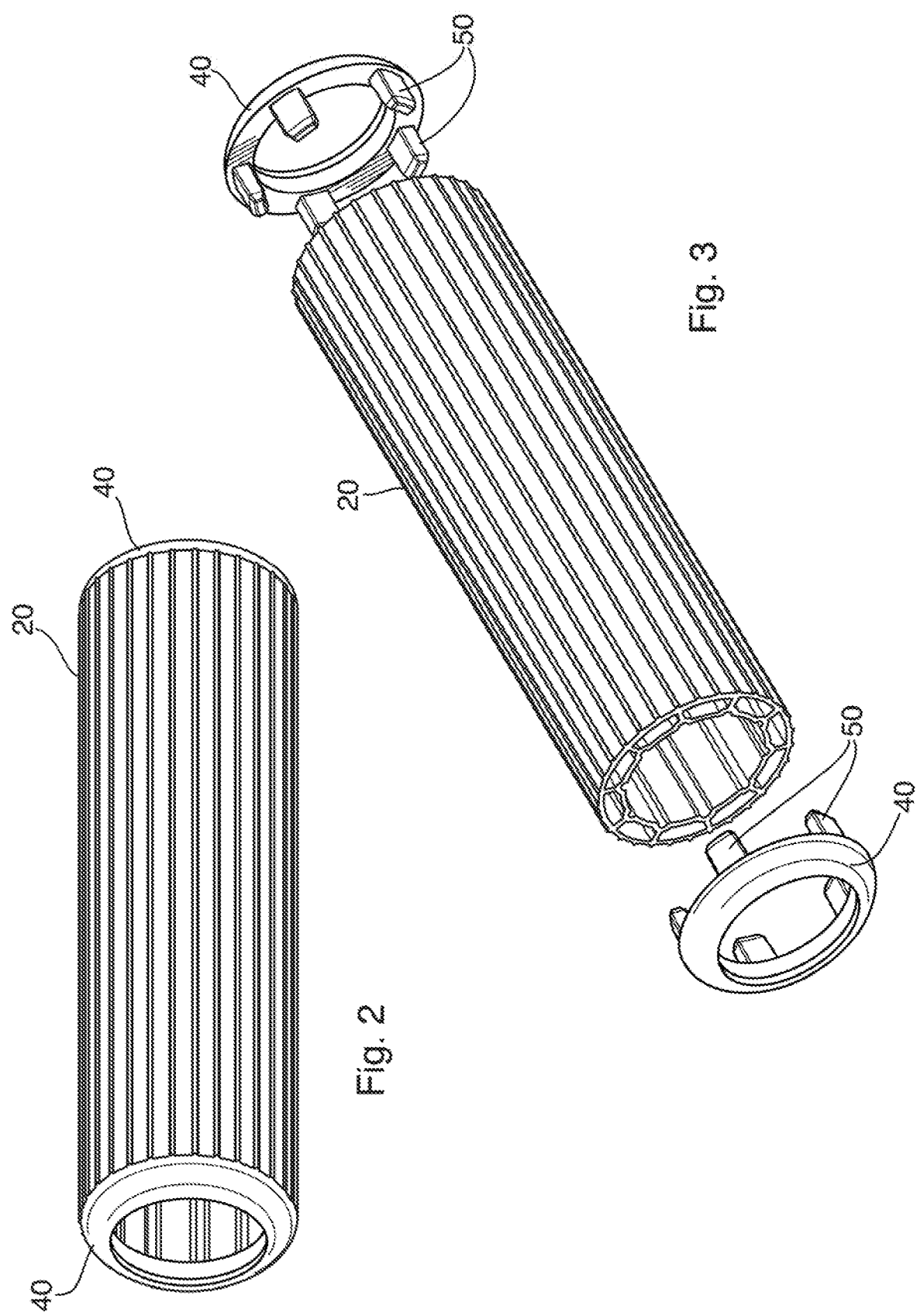

STANCHION PADDING

RELATED APPLICATION

This application claims benefit of Provisional Application No. 62/378,771 filed Aug. 24, 2016, which is incorporated herein by reference in its entirety.

FIELD OF THE INVENTION

The present invention relates to stanchion padding and more specifically to stanchion padding for use in transit vehicles.

BACKGROUND

Stanchions comprised of steel tubing are installed within many public transit vehicles, such as buses, subways/metros and passenger trains. The stanchions are traditionally installed either vertically or horizontally (or portions of both) near the passenger entrances, exits and aisles. Passengers can grasp the stanchions to steady themselves, for example, while making their way on and off and throughout the vehicle.

In some cases, a tubular padding is installed around a portion of stanchion. This padding is intended to provide comfort and some level of protection should a passenger come in accidental contact with the metal stanchion. Traditionally, the padding consists of a polyurethane, or similar, foam. The foam is molded into a tubular shape and then pushed onto the end of the steel stanchion.

SUMMARY OF THE INVENTION

In an embodiment of the present invention, there is a stanchion padding comprising a tube having a hollow centre running through it from a first end to a second end and the tube also comprising an exterior wall and an interior wall joined by at least two channel walls forming at least two hollow channels. These hollow channels may be adapted to receive end caps and at least one end cap may be installed onto either the first end or the second end of the tube.

The interior wall may additionally have small inner channels running the length of the tube.

In an embodiment of the invention at least one end cap has a top surface and a bottom surface and projections extend from the bottom surface, wherein the projections are shaped to be received by the hollow channels of the tube.

The tube may be made by thermoplastic extrusion, and the end caps may be made by thermoplastic injection molding.

BRIEF DESCRIPTION OF THE DRAWINGS

These and other aspects of the present invention will be apparent from the brief description of the drawings and the following detailed description in which:

FIG. 2 is a perspective view of an embodiment of a stanchion padding of the present invention;

FIG. 3 is an exploded view of an embodiment of a stanchion padding of the present invention;

DETAILED DESCRIPTION OF THE DRAWINGS

Figure 1:
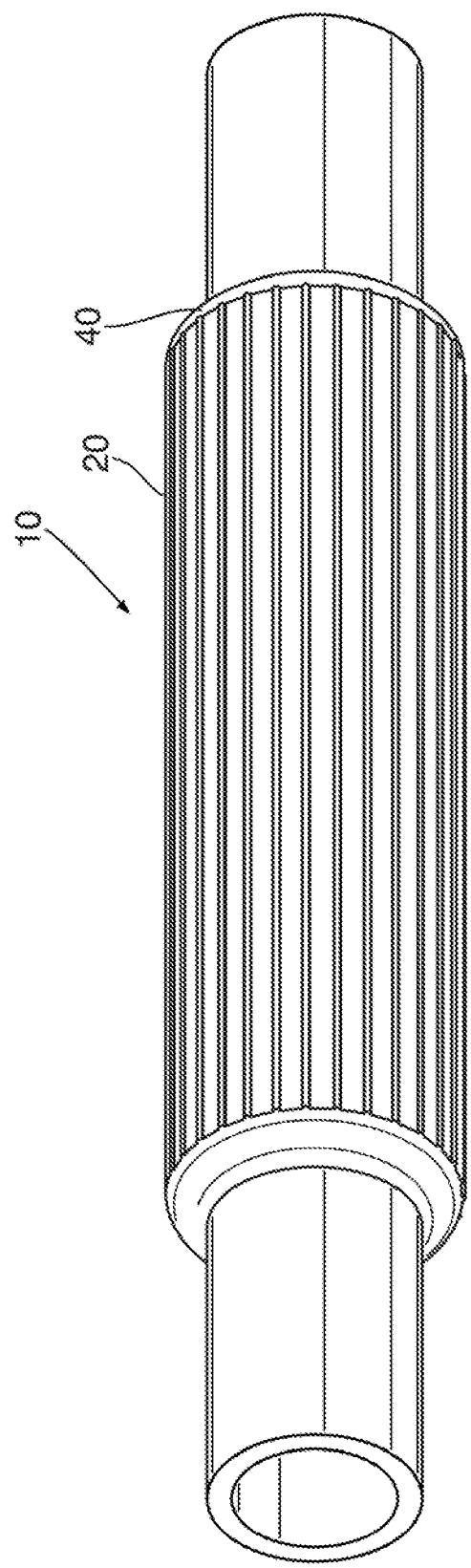
FIG. 1 is an environmental view of an embodiment of a stanchion padding of the present invention in which the stanchion padding is installed on a stanchion.
Figure 4C:
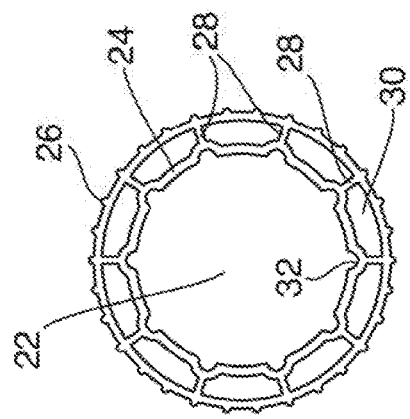
FIG. 4C is a top view of an embodiment of a stanchion padding of the present invention.

Referring to FIGS. 1, 2 and 3, the stanchion padding (10) of an embodiment of the present invention is a tube (20) that may also comprise one or more end caps (40). As seen in FIG. 4C, the tube (20) has a hollow centre (22) running through it, said hollow centre shaped to receive and be secured on a stanchion. The tube may be secured on the stanchion through a snug fit or through the use of an adhesive, such as tape or glue, or any combination of a snug fit and an adhesive.

Figure 4B:
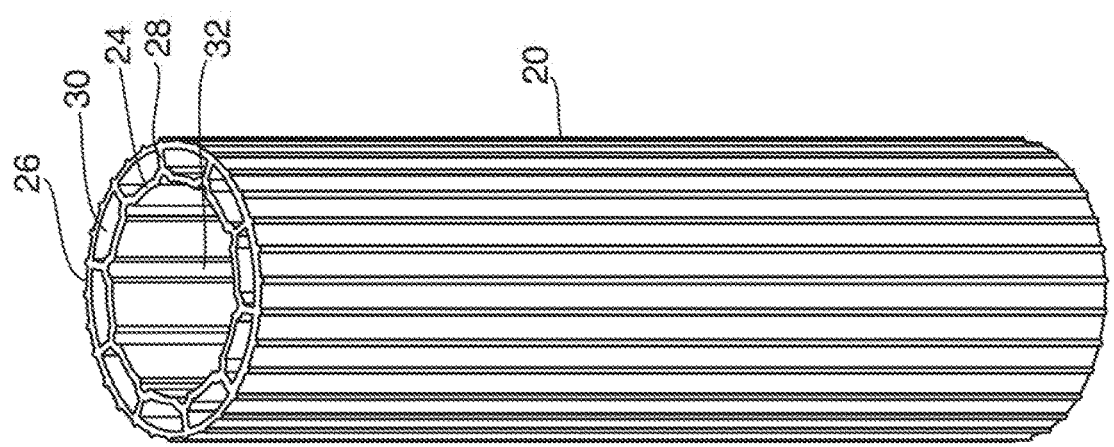
FIG. 4B is an isometric view of an embodiment of a stanchion padding of the present invention.
Figure 4A:
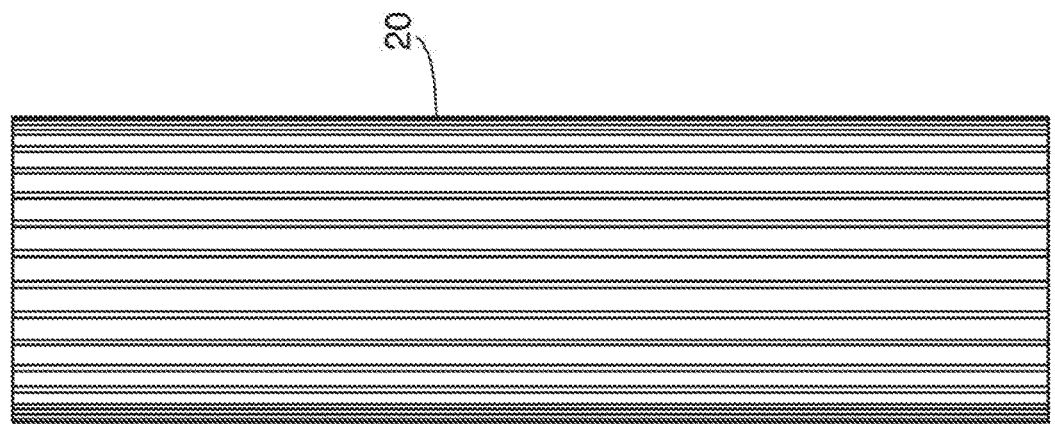
FIG. 4A is a side view of an embodiment of a stanchion padding of the present invention.

As shown in FIGS. 4A to 4C, the tube has an interior wall (24) and an exterior wall (26) joined through at least two channel walls (28) forming ten hollow channels (30) inside the tube (20) between the interior (24) and exterior (26) walls. The hollow channels (30) provide give and therefore comfort and a measure of protection to passengers. The hollow channels (30) run lengthwise along the interior of the tube.

It is understood that the channels (30) could be configured in different ways. In an embodiment of the present invention, the channels (30) are configured so that they are adapted to receive the end caps. Smaller channels, in which there are multiple channel walls, would make an embodiment of the stanchion padding of the present invention have less flexibility or give to the tube. For example, when a passenger of a transit vehicle held the tube with smaller channels, the tube would feel stiffer to the passenger. Larger channels, where there are fewer channel walls, would make an embodiment the transit vehicle interior stanchion padding of the present invention have more flexibility or give to the tube. For example, when a passenger of a transit vehicle held the tube with larger channels, the tube would feel softer to the passenger.

The interior wall (24) of the tube (20) comprises small inner channels (32) formed as a part of the interior wall and running the length of the interior wall. These small inner channels (32) provide space between the stanchion and the tube (20). In an embodiment of the present invention, the small inner channels (32) allow the tube to be installed more easily than if the entire interior wall (24) of the tube was in contact with the stanchion. The small inner channels (32) may also allow space for an adhesive such as glue to travel from the ends of the tube (20) towards the middle. Without the small inner channels, any adhesive applied to the end of the tube may be displaced as the tube is pushed onto a stanchion.

In an embodiment, the exterior wall (26) of the tube may be textured for an enhanced look and feel.

In an embodiment of the present invention, end caps (40) may be installed on one or both ends of the tube (20). The end caps are shaped to match the shape of the tube. The end caps (40), shown in FIGS. 5A to 5E, have one or more projections (50) extending away from the bottom surface (42) of the end caps. The projections are receivable by the hollow channels so that the end cap(s) can be secured to the tube (20) forming the stanchion padding (10). The projections (50) are sized so that they fit snuggly and securely into the hollow channels (30). The end cap(s) (40) may be installed onto the ends of the tube (20) with an adhesive to give the piece a finished look and feel. Although projections being received into the hollow channels (30) of the tube and the use of an adhesive are shown as the means to attach the end caps to the tube, it is understood that other known means could also be used to secure end caps to the ends of the tube.

Figure 5C:
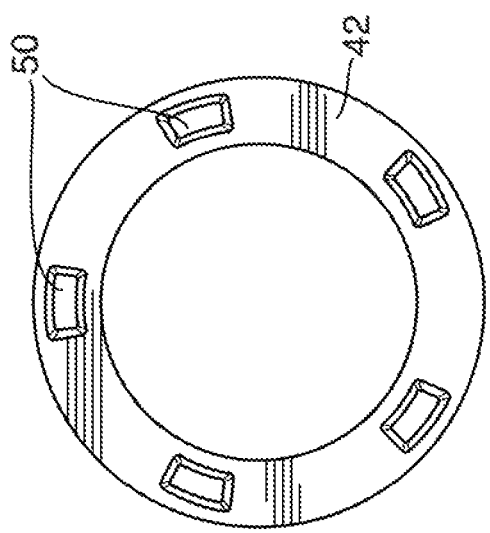
FIG. 5C is a bottom view of an embodiment of an end cap of an embodiment of a stanchion padding of the present invention.
Figure 5B:
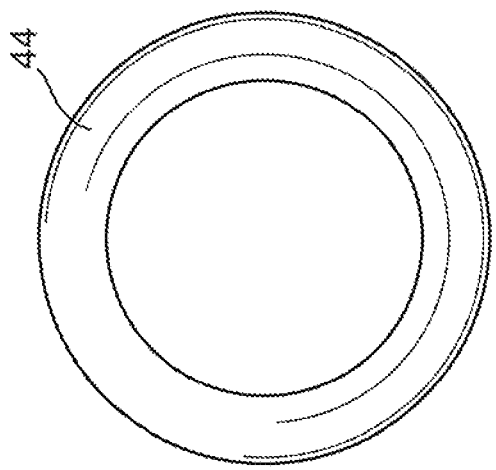
FIG. 5B is a top view of an end cap of an embodiment of a stanchion padding of the present invention.
Figure 5E:
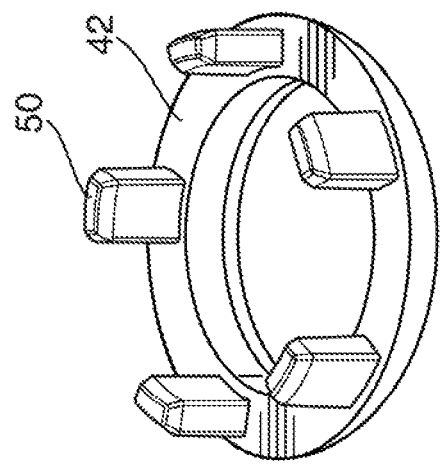
FIG. 5E is a bottom perspective view of an embodiment of an end cap of an embodiment of a stanchion padding of the present invention.
Figure 5A:
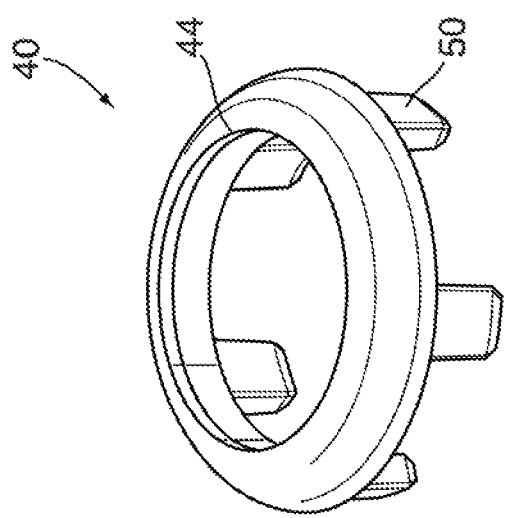
FIG. 5A is a top perspective view of an embodiment of an end cap of an embodiment of a stanchion padding of the present invention.
Figure 5D:
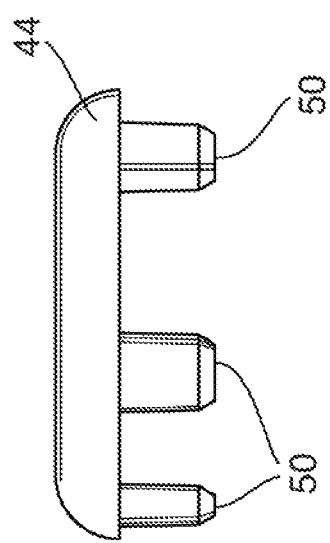
FIG. 5D is a side view of an embodiment of an end cap of an embodiment of a stanchion padding of the present invention.

In an embodiment shown in FIGS. 5A, 5B and 5D, the top surface (44) of the end caps that are exposed to the air and to passengers are smooth.

The end caps are both functional and aesthetic. The end caps seal the end or ends of the tube to avoid debris from entering the tube and to prevent sharp edges at the ends of the tube from injuring passengers on the transit vehicle.

Unlike traditional molded foam padding, the tube (20) of an embodiment of the present invention is made from extruded thermoplastic tubing. The extruded tubing is cut to the desired length of tube (20). Similar to the traditional foam padding, the extruded thermoplastic tubing is pushed onto the end of the steel stanchion. End caps (40) are also made from a thermoplastic injection molding process. The thermoplastic tubing and end caps can be made in a variety of colors, including high contrast colors favoured for certain items installed within public transit vehicles.

Unlike traditional molded foam padding, such as polyurethane or foams, there are a wide variety of material property profiles available with the use of thermoplastics. Thermoplastics with certain desired low flammability, low smoke generation and low toxicity properties are available while polyurethane, or similar, foam with such properties are not available. This means that transit vehicle interior stanchion padding can now be made from safer and more desirable material, while providing the same, or similar comfort and measure of protection to passengers.

It is understood that while the present invention has been described for a transit vehicle stanchion, it could be used to cover poles and stanchions with padding generally, for example in small motor vehicles, the cabin of a boat or ferry, or in a horse trailer, etc.

While embodiments of the invention have been described in the detailed description, the scope of the claims should not be limited by the preferred embodiments set forth in the examples, but should be given the broadest interpretation consistent with the description as a whole.

The invention claimed is:

1. A stanchion padding to cover a transit vehicle stanchion comprising:
   an extruded thermoplastic tube having an exterior wall concentric with an interior wall and a hollow center extending lengthwise from a first open end to a second open end, the exterior wall having an outer side and an inner side, the interior wall having an outer side and inner side, the outer side of the interior wall facing the inner side of the exterior wall, and an inner side of the interior wall facing the hollow center;
   at least two channel walls extending lengthwise from the first open end to the second open end between the outer side of the interior wall and the inner side of the exterior wall, and said at least two channel walls forming hollow channels defined by the inner side of the exterior wall, the outer side of the interior wall, and two of the at least two channel walls;
   a plurality of inner u-shaped channels on the inner side of the interior wall and open to the hollow center extending lengthwise from the first open end to the second open end, wherein each of the plurality of inner u-shaped channels abuts a respective one of said at least two channel walls at the interior wall;
   a plurality of ridges on the outer side of the exterior wall extending lengthwise from the first end to the second end; and
   wherein the stanchion padding is adapted to cover the transit vehicle stanchion such that, when the stanchion padding is installed on the transit vehicle stanchion, the interior wall is in contact with the transit vehicle stanchion except at the plurality of inner u-shaped channels, the interior wall remains concentric with the exterior wall, and the hollow channels remain defined by the inner side of the exterior wall, the outer side of the interior wall and two of said at least two channel walls.

2. A padded transit vehicle stanchion comprising a transit vehicle stanchion covered by the stanchion padding of claim 1, wherein the transit vehicle stanchion is at least as long as the stanchion padding.

3. The stanchion padding of claim 1, wherein the hollow channels are adapted to receive end caps.

4. The stanchion padding of claim 1, wherein at least one end cap is installed onto the first end or the second end of the extruded thermoplastic tube.

5. The stanchion padding of claim 4, wherein said at least one end cap has a top surface, a bottom surface and projections extending from the bottom surface, wherein the projections are shaped to be received by the hollow channels of the extruded thermoplastic tube.

6. The stanchion padding of claim 4, wherein the extruded thermoplastic tube and said at least one end cap are made by thermoplastic injection molding.

7. The stanchion padding of claim 1, wherein there are ten channel walls forming ten closed hollow channels.

8. The stanchion padding of claim 1, wherein the plurality of inner u-shaped channels is configured to retain an adhesive applied to the plurality of inner u-shaped inner channels at the first end of the extruded thermoplastic tube and to enable the adhesive to travel towards the second end of the extruded thermoplastic tube.

* * * * *